Nov. 2, 1943.  H. A. KNOX  2,333,107
SUSPENSION
Filed Dec. 22, 1941  6 Sheets-Sheet 1
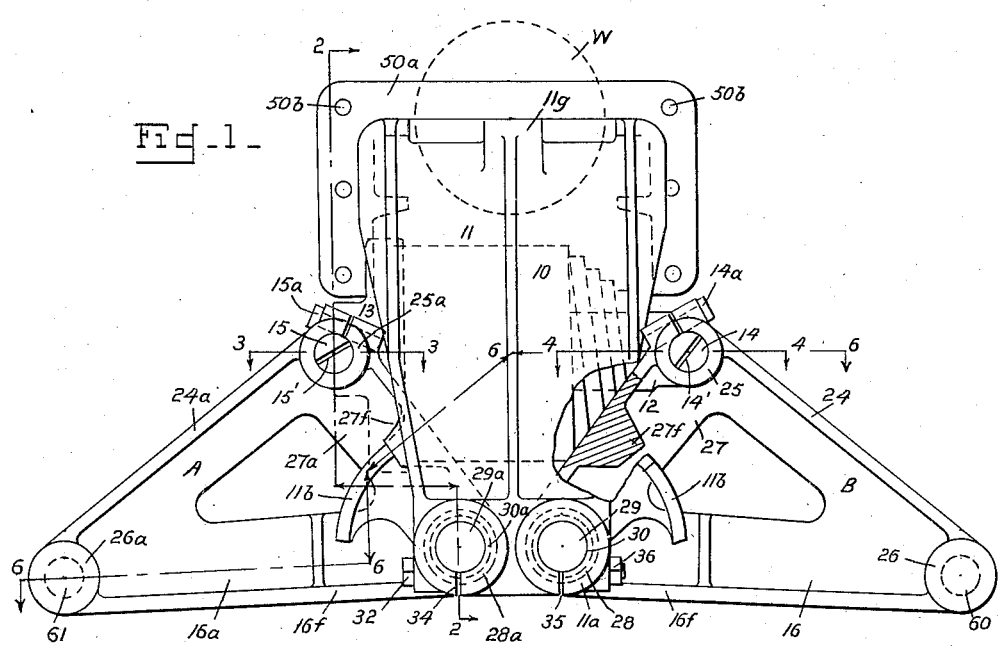
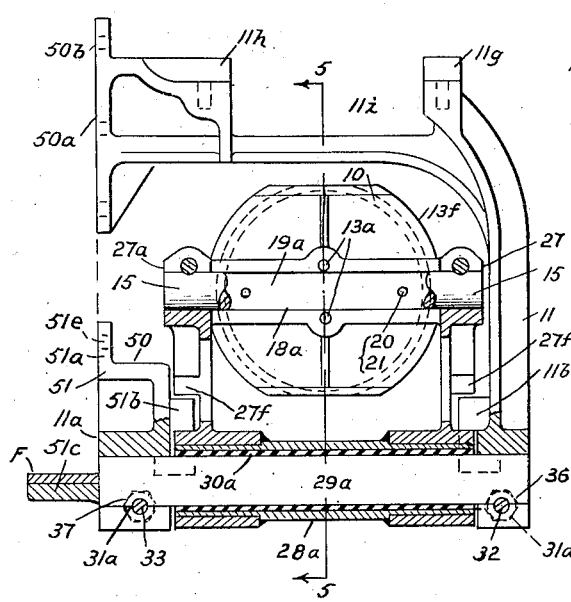
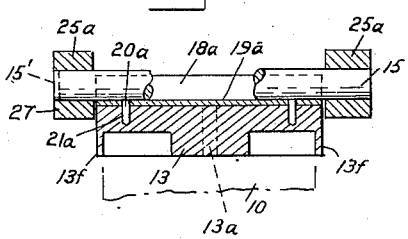
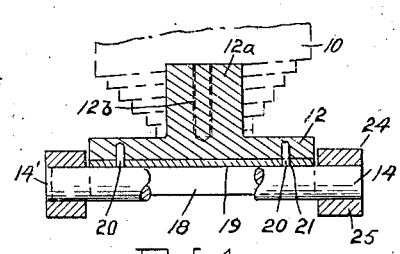
Inventor
Harry A. Knox

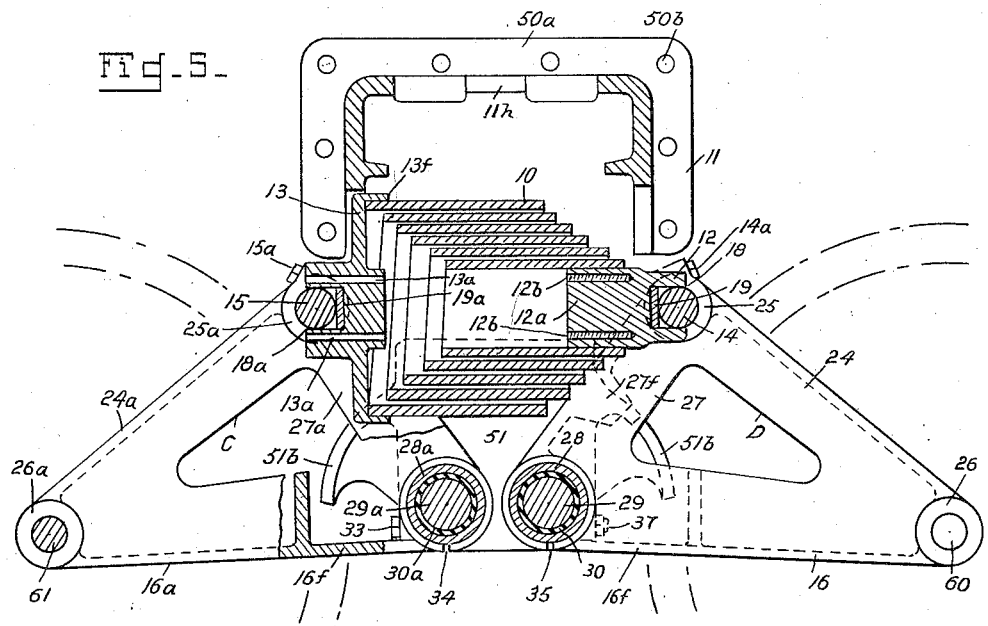

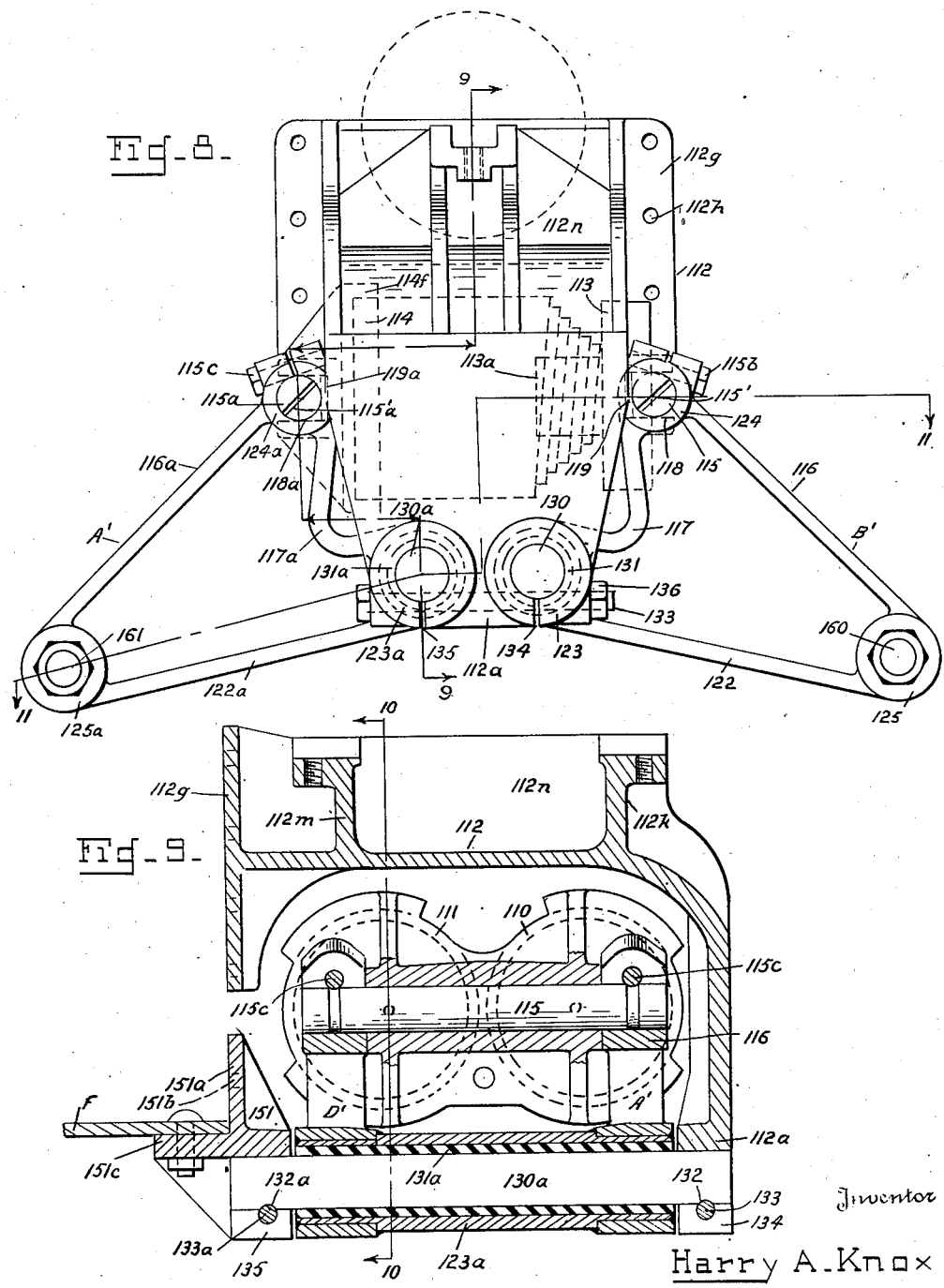

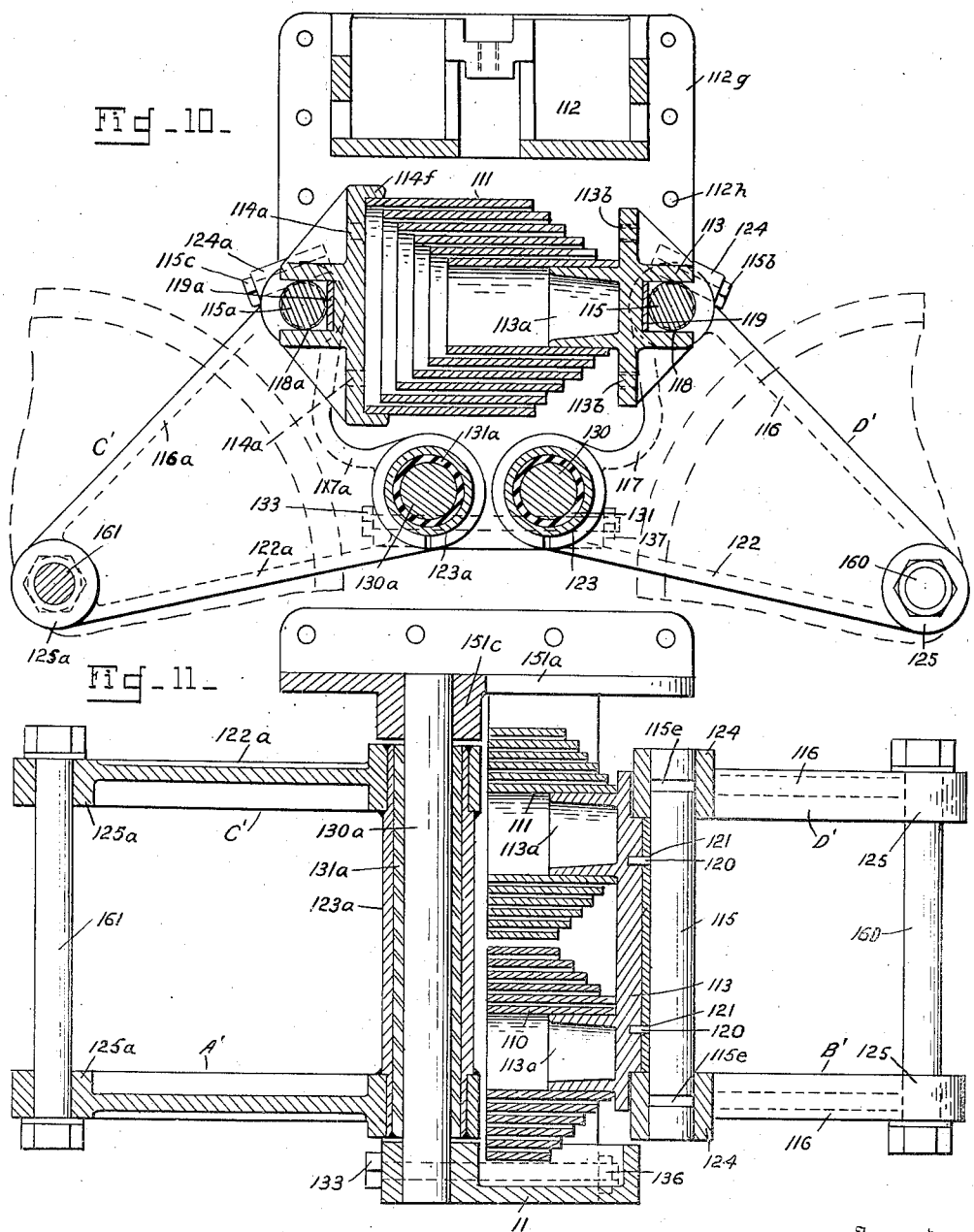

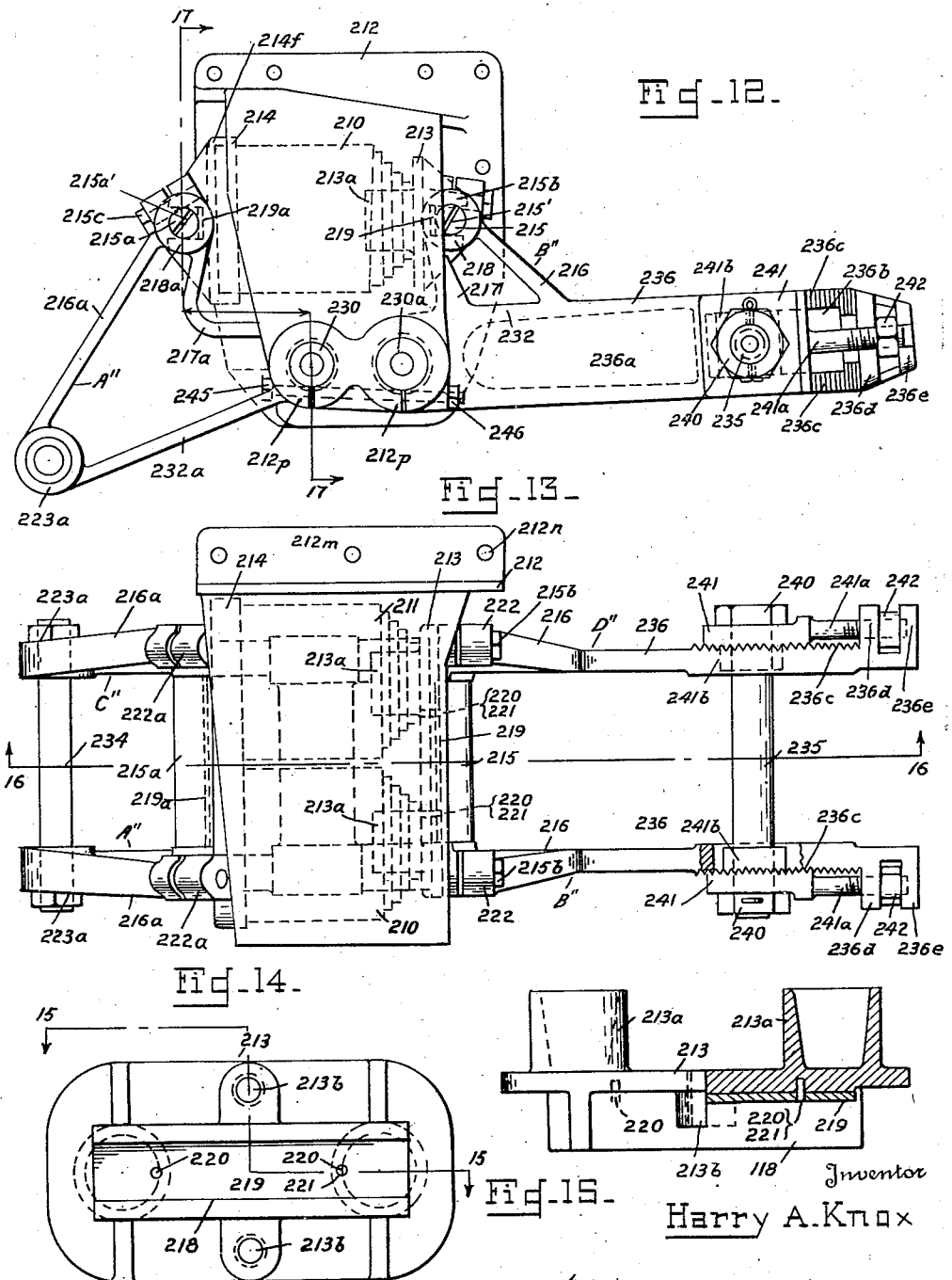

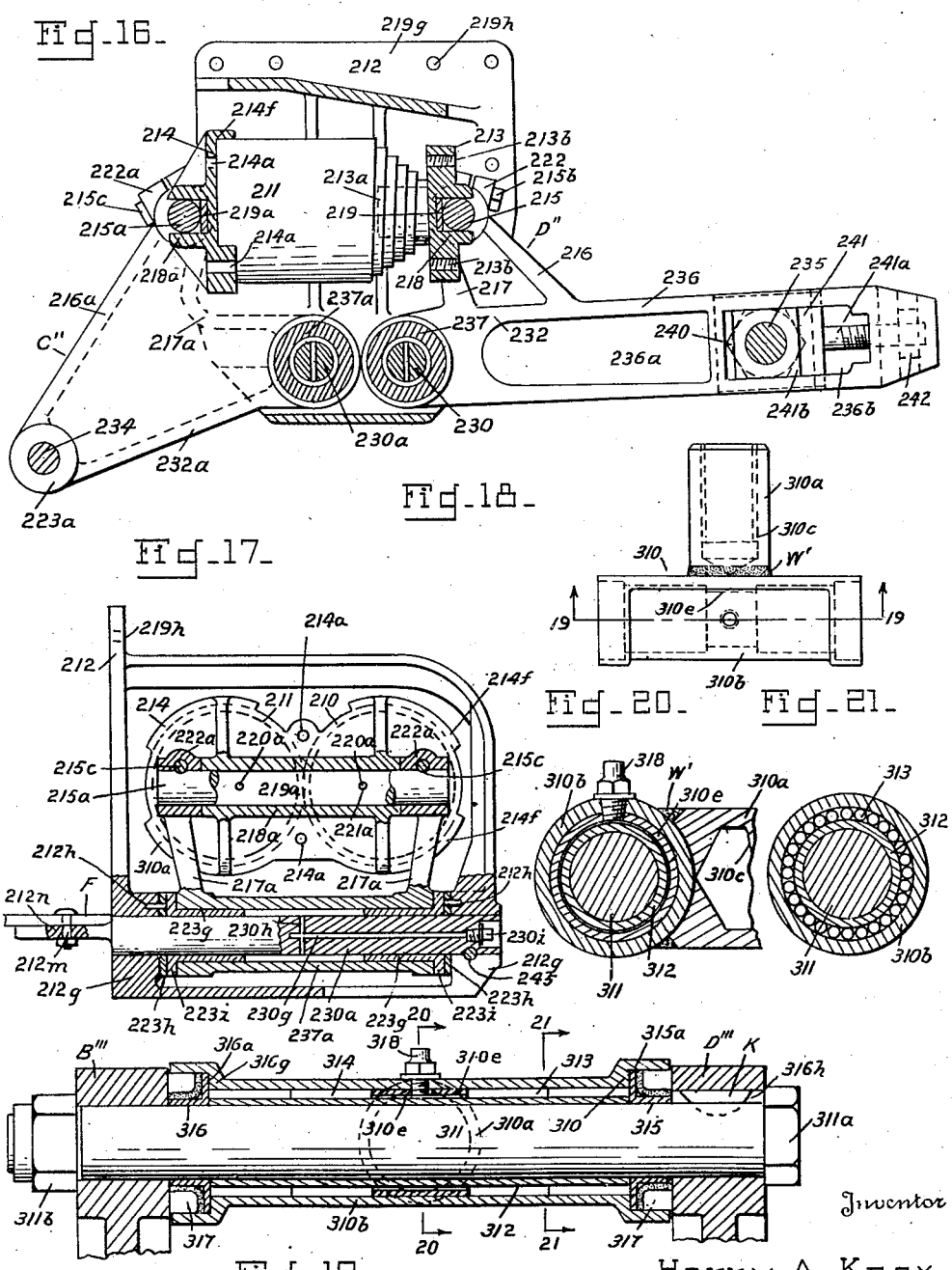

Patented Nov. 2, 1943

2,333,107

UNITED STATES PATENT OFFICE 2,333,107

SUSPENSION

Harry A. Knox, Washington, D. C.

Application December 22, 1941, Serial No. 423,888

13 Claims. (Cl. 267—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a suspension for a vehicle.

An object of this invention is to provide a resilient suspension for the wheels of a track laying vehicle.

Another object of this invention is to provide a suspension for the main supporting wheels and idler wheels of a track laying vehicle incorporating a volute spring and positive means for mounting the suspension to the body of the vehicle.

Another object of this invention is to provide a suspension for the main supporting wheels and trailing idler wheel of a track laying vehicle and said suspension has practically a linear displacement versus restoring force characteristic for small displacements of those wheels and furnishes more than a proportionate restoring force for large displacements of the idler wheel.

Another object of this invention is to provide a compact suspension for a pair of wheels on a vehicle incorporating common resilient means.

Another object of this invention is to provide novel means for pivotally mounting a pair of vehicle wheels in spaced relationship to a common resilient means.

The suspensions disclosed herein support two parallel spaced wheel axles resiliently and for a suspension which supports but one wheel axle resiliently in a manner somewhat similar to that disclosed in the instant application reference is made to my copending application, Serial No. 399,661 filed June 25, 1941, now Patent No. 2,323,919, issued July 13, 1943.

The specific nature of the invention as well as other objects and advantages thereof will clearly appear from a description of a preferred embodiment as shown in the accompanying drawings in which:

Fig. 1 is a view in side elevation of a single spring suspension embodying features of this invention and has parts broken away so as to more clearly show the stops which are formed integral with the bracket frame and movable wheel supporting arms.

Fig. 2 is a view taken substantially on line 2—2 of Fig. 1.

Fig. 3 is a view taken substantially on line 3—3 of Fig. 1.

Fig. 4 is a view taken substantially on line 4—4 of Fig. 1.

Fig. 5 is a view taken substantially on line 5—5 of Fig. 2.

Fig. 6 is a view taken substantially on line 6—6 of Fig. 1.

Fig. 7 is a sectional view of the clamp 25a and shows the manner in which bolt 15a holds pin 15 against axial movement.

Fig. 8 is a view in side elevation of a double spring suspension embodying features of this invention.

Fig. 9 is a view taken substantially on line 9—9 of Fig. 8.

Fig. 10 is a view taken substantially on line 10—10 of Fig. 9.

Fig. 11 is a view taken substantially on line 11—11 of Fig. 8.

Fig. 12 is a view in side elevation of a double spring suspension for an intermediate wheel and an idler wheel of a track laying vehicle.

Fig. 13 is a plan view of the suspension shown in Fig. 12.

Fig. 14 is a side view of the spring seat 213 which is shown in Fig. 12.

Fig. 15 is a view taken substantially on line 15—15 of Fig. 14.

Fig. 16 is a view taken substantially on line 16—16 of Fig. 13.

Fig. 17 is a view taken substantially on line 17—17 of Fig. 12.

Fig. 18 discloses a plan view of a modified spring seat.

Fig. 19 discloses a sectional view of a modified lubricated connection between the spring seat disclosed in Fig. 18 and the frame members carrying the vehicle.

Fig. 20 is a view taken substantially on line 20—20 of Fig. 19.

Fig. 21 is a view taken substantially on line 21—21 of Fig. 19.

*Single spring suspension*

Referring to Figs. 1–7, a single volute spring 10 is adapted to be encased within the bracket 11, 51 between two movable spring seats 12, 13 so as to provide a resilient support for the fixed pins 14, 15 which are rigidly connected at the junction of wheel supporting arms 24, 27, 24a, 27a respectively, Fig. 7. The spring seats 12 and 13 have a channel 18, 18a respectively in which a hardened rectangular plate 19, 19a is centrally held by means of pins 20, 20a (Figs. 3 and 4) which are rigidly fixed in spring seat 12, 13 and fit loosely in holes 21, 21a in the hardened bar, respectively. The spring seat 12 has a projecting portion 12a having a pair of tapped holes 12b therein for lightness and for assembly purposes. Circular pins 14, 15 are hardened and adapted to abut the hardened plates 19, 19a respectively substantially along a line contact. Pins 14, 15 are held in the pair of split clamps 25, 25a (Fig. 7) respectively which are integral with wheel supporting arms 24, 27, 24a, 27a respectively and the clamping bolts 14a, 15a pass through grooves 14b, 15b in the ends of pins 14, 15 so as to prevent axial movement of the pins.

The wheels of the vehicle are supported by axles 60, 61 which are held at their ends in spaced hollow portions 26, 26a formed at the junction of the supporting arms 24, 16 and 24a, 16a.

Arms 27, 27a are joined with arms 16, 24 and 16a, 24a respectively so as to produce four separate triangular-shaped frame members A, B, C, D, having a hollow portion at the corner of each of the triangles for the reception of a cylindrical member. The triangular-shaped structures are arranged in pairs and are joined by tubes 28, 28a (Fig. 2) by welding, brazing or mechanical fastening means.

Pins 14, 15 are rigidly connected to the triangular-shaped structures by means of clamping bolts 14a, 15a respectively which tighten the split clamps 25, 25a and thus provide a rigid supporting structure. Grooves 14', 15' in the ends of pins 14, 15 allow engagement of a mechanical tool for rotating the pins 14, 15 a small amount when they become worn and when they no longer provide a line contact with the hardened bars 19, 19a at the spring seats 12, 13; clamps 25, 25a (Fig. 7) would have to be loosened before this operation could be performed.

A resilient coupling is provided between tubes 28, 28a and shafts 29, 29a respectively by driving them through the tight-fitting rubber bushings 30, 30a respectively which extend practically the length of the tubes 28, 28a. The ends of shafts 29, 29a have grooves similar to that shown at 31a in Fig. 2 through which common locking bolts 32, 33 are adapted to pass so as to prevent the shafts 29, 29a from moving axially; also the suspension bracket 11 is split at 34, 35 (Fig. 1) so that the suspension bracket portion 11a which encircles the ends of shafts 29, 29a is drawn up tight around those ends when nuts 36, 37 on bolts 32, 33 are tightened. Thus relative movement between the triangular-shaped supporting structures A, B, C, D and shafts 29, 29a is accommodated by the resiliency of the rubber bushings 30, 30a.

Spring seat 13 has a pair of holes 13a (Fig. 5) therein for the passage of assembly bolts (not shown) having a tapped portion engageable with tapped holes 12b in the other spring seat 12.

Extensions 11b, 51b (Fig. 6) on the suspension brackets 11 and 51 respectively are adapted to cooperate with the flanges 16f on arms 16, 16a so as to limit the upward movement of those arms and associated wheels. The downward movement of arms 16, 16a and associated wheels is limited by the coaction of extensions 11b, 51b with the projections 27f on arms 27, 27a.

The volute spring 10 is held in centered relation in its housing by means of the surrounding flange portions 13f (Fig. 3) on spring seat 13 and the projection 12a on spring seat 12.

The supporting bracket is made in two parts 11 and 51. Bracket 11 has a flange 50a having holes 50b therein for the passage of mechanical fastening means for fastening bracket 11 to a vertical wall. Bracket 51 has a flange 51a having holes 51e therein for the passage of mechanical fastening means for fastening bracket 51 to a vertical wall; also bracket projection 51c has holes 51d therethrough for the passage of mechanical fastening means for fastening the projection 51c to the underside of a vehicle floor F.

The bracket 11 also has two upstanding supports 11g, 11h adapted to have inserted therein a portion of a wheel bearing and a hollow portion 11i within which a portion of the supported wheel W extends. The last mentioned wheel is used to support the track for the track laying vehicle.

*Double spring suspension*

This construction (Figs. 8-11) is similar to the construction shown for the single spring light suspension.

Two volute springs 110, 111 are encased in the bracket 112 between two movable spring seats 113, 114 so as to provide a resilient support for the fixed pins 115, 115a which are rigidly connected at the junction of wheel-supporting arms 116 with 117, and 116a with 117a respectively. The spring seats 113, 114 have a channel 118, 118a respectively in which a hardened rectangular plate 119, 119a is centrally held by means of pins similar to pins 120, which are rigidly fixed in spring seats 113, 114 and fit loosely in holes similar to hole 121, in the hardened plate 118. The spring seat 113 has projecting portions 113a having a pair of tapped holes 113b therein for lightness and for assembly purposes. Circular pins 115, 115a are hardened and adapted to abut the hardened plates 119, 119a respectively substantially along a line contact. Pins 115, 115a are held in the pairs of split clamps 124, 124a respectively which are integral with wheel supporting arms 116, 117, 116a, 117a respectively.

The wheels of the vehicle are supported by axles 160, 161 which are held at their extremities in spaced hollow portions 125, 125a formed at the junction of the supporting arms 116 with 122 and 116a with 122a.

Arms 116, 116a are joined with arms 117, 117a and with arms 122, 122a respectively so as to produce four separate triangular-shaped frame members A', B', C', D', having a hollow portion at the corner of each of the triangles for the reception of a cylindrical member. The triangular-shaped frame structures are arranged in pairs and are joined by tubes 123, 123a by welding, brazing or mechanical fastening means.

Pins 115, 115a are rigidly connected to the triangular-shaped structures by means of clamping bolts 115b, 115c respectively and thus provide a rigid supporting structure. The bolts pass through pin grooves similar to 115e in Fig. 11. Grooves 115', 115a' in the ends of pins 115, 115a allow engagement of a mechanical tool for rotating the pins 115, 115a a small amount when they become worn and when they no longer provide a line contact with hardened bars 119, 119a at the spring seats 113, 114; clamps 124, 124a would have to be loosened before this operation could be performed.

A resilient coupling is provided between tubes 123, 123a and shafts 130, 130a respectively by driving them through the tight-fitting resilient rubber bushings 131, 131a respectively which extend practically the length of the tubes 123, 123a. The ends of shafts 130, 130a have detents 132, 132a therein through which common locking bolts 133, 133a are adapted to pass so as to prevent shafts 130, 130a from rotating and from moving axially; also the suspension bracket 112 is split at 134, 135 so that the suspension bracket portion 112a which encircles the ends of shafts 130, 130a is drawn up tight around those ends when nuts 136, 137 on bolts 133, 133a are tightened. Thus relative movement between the triangular-shaped supporting structures A', B', C', D' and shafts 130, 130a is accommodated by the resiliency of the rubber bushings 131, 131a.

Spring seat 114 has a pair of holes 114a therein for the passage of an assembly bolt (not shown) having a tapped portion engageable with one of the tapped holes 113b in the other spring seat 113.

The volute springs 110, 111 are held in centered relation in its bracket housing 112 by means of the surrounding flanges 114f on spring seat 114 and the pair of projections 113a on spring seat 113.

The supporting bracket is made in two parts 112, 151. Bracket 112 has a flange 112g having holes 112h therein for the passage of mechanical fastening means for fastening bracket 112 to a vertical wall. Bracket 151 has a flange 151a having holes 151b therein for the passage of mechanical fastening means for fastening bracket 151 to a vertical wall, also projection 151c has holes therethrough for the passage of mechanical fastening means for fastening the projection 151c to the underside of a vehicle floor F.

The bracket 112 also has two upstanding supports 112k, 112m adapted to hold a wheel bearing and a hollow portion 112n within which a portion of the supported wheel extends. The last mentioned wheel is used to support the track for track laying vehicles.

*Double spring suspension for trailing idler*

This construction relates to an arrangement wherein one of the intermediate vehicle wheels and a trailing idler wheel of a track laying vehicle are resiliently supported by a common suspension.

Two volute springs 210, 211 are encased in the bracket 212 between two movable springs seats 213, 214 so as to provide a resilient support for the fixed pins 215, 215a which are rigidly connected at the junction of wheel supporting arms 216, 217, 216a, 217a respectively. The spring seats 213, 214 have a channel 218, 218a (Fig. 16) respectively in which a hardened rectangular plate 219, 219a is centrally held by means of pins 220, 220a which are rigidly fixed in spring seats 213, 214 and fit loosely in holes 221, 221a in the hardened bar respectively. The spring seat 213 has projecting portions 213a insertable in the hollow portions of volute springs 210, 211 and have a pair of tapped holes 213b therein for lightness and for assembly purposes. Circular pins 215, 215a are hardened and adapted to abut the hardened plates 219, 219a respectively substantially along a line contact. Pins 215, 215a are held in the pair of split clamps 222, 222a respectively which are integral with and at the junction of wheel supporting arms 216, 217, 216a, 217a respectively.

The intermediate vehicle wheel is supported by an axle 234 which is held at its extremities in spaced hollow portions 223a. Hollow portions 223a are formed at the junction of the supporting arms 216a, 232a and serve to confine the axle 234 of an intermediate wheel of the track laying vehicle.

The idler wheel of the track laying vehicle is adapted to be mounted on axle 235 which is adjustably mounted on the pair of arms 236. The idler wheel axle 235 may be adjustably mounted by means disclosed in my copending application, Serial No. 397,127 filed June 7, 1941.

The axle 235 is movable within the hollow portions 236b of arm 236 by loosening clamping nuts 240 so that washers 241 having a grooved surface adapted to cooperate with grooved surfaces 236c on the sides of arms 236 may be brought out of engagement with those grooved surfaces, and then by turning nuts 242 on the threaded washer extensions 241a. In the above operation nut 242 is prevented from moving along its axial direction due to spaced abutments 236d, 236e on arm 236 and consequently as the nuts 242 are rotated the washers 241 must move as well as the axle 235 which is threaded through those washers. Also washer 241 has a portion 241b with a rectangular cross section adapted to fit snugly in the arm hollow portion 236b so as to form a guide for movement of the axle 235 during the adjusting operation.

Arms 216, 216a are joined with arms 217, 217a, 232, and 232a respectively so as to produce four separate triangular-shaped frame members A", B", C", D". The triangular-shaped structures are arranged in pairs and are joined by tubes 237, 237a by welding, brazing or mechanical fastening means.

Pins 215, 215a are rigidly connected to the triangular shaped structures by means of clamping bolts 215b, 215c respectively and thus provide a rigid supporting structure. Grooves 215', 215a' in the ends of pins 215, 215a allow engagement of a mechanical tool for rotating the pins 215, 215a a small amount when they become worn and when they no longer provide a line contact at spring seats 213, 214; clamps 222, 222a would have to be loosened before this operation could be performed.

A hardened bearing surface with lubricating means therefor is provided between tubes 237, 237a and shafts 230, 230a respectively. The frame members A", B", C", D" are pivotally mounted on shafts 230, 230a. The hardened bushings 223g are shrunk or pressfitted to the tubular members 237, 237a and may be considered to be a part of those respective tubular members. The bearing for shaft 230a is disclosed and it is understood that the bearing for shaft 230 is of identical structure. Hardened rings or plates 223h (Fig. 17) are fastened to the bracket hubs 212g by means of dowel pins 212h which have one end fastened in the hubs 212g and the other end extending into a hole in the rings or plates 223h. The hardened rings or plates 223h cooperate with the flanged portion 223i of bushing 223g so that a hardened bearing surface is provided to take up the end thrust of shafts 230, 230a.

The shafts 230, 230a have axially extending channels 230g and connected radially extending channels 230h for the passage of lubricating material to the hardened bearing surfaces provided by bushings 223g and plates 223h. Suitable lubricating fluid check valves 230i of any of the well known types are recessed in the ends of shaft 230, 230a and in communication with the lubricating channel 230g. Shafts 230, 230a are held in a fixed position in bracket 212 by means of a common locking bolt 245 which passes through grooves in those shafts (Fig. 17) and which together with its associated nut 246 serves to draw up the surrounding split bracket portions 212p (Fig. 12) around one of the ends of the shafts 230, 230a so as to clamp these shafts against rotation.

Thus relative movement between the triangular-shaped supporting structures A'', B'', C'', D'' and shafts 230, 230a is accommodated by the lubricated shaft 230, 230a.

Spring seat 214 has holes 214a therein for the passage of an assembly bolt (not shown) having a tapped portion engageable with one of the tapped holes 213b in the other spring seat 213.

The volute springs 210, 211 are held in centered relation in its bracket housing 212 by means of the surrounding flanges 214f on spring seat 214 and the pair of projections 213a on spring seat 213.

The supporting bracket 212 is made in one part and has a flange 219g having holes 219h therein for the passage of mechanical fastening means for fastening bracket 212 to a vertical wall; also, bracket 212 has a flange 212m having holes 212n therein for the passage of mechanical fastening means for fastening the bracket 212 to the vehicle floor F.

Figs. 18-21 disclose a modified bearing for joining the wheel supporting frame member to its associated spring seat. Spring seat 310 is formed from two cylindrical members 310a, 310b arranged to form a T-shaped spring seat by a weld W or by mechanical means. Cylindrical member 310a is adapted to be disposed in the hollow portion of a volute spring as indicated on the previous figures and has a tapped portion 310c adapted to receive an assembly tool (not shown). It is obvious that more than one cylindrical member 310a may be provided on the spring seat in accordance with the number of volute springs in the suspension.

Cylindrical member 310b is made hollow so that a shaft 311 may be threaded therethrough and spaced therefrom by means of sleeve 312 and needle bearings 313, 314. Two sets of needle bearings 313, 314 are spaced from one another by means of the inner flange 310e which may be formed integral with cylinder 310b. Hardened bearing members 315, 316 are disposed on opposite ends of sleeve 312 and have flanges 315a, 316a adapted to cooperate with shoulders 310f, 310g respectively so as to prevent end thrust in the composite bearing. Shaft 311 extends through hollow portions in triangular-shaped frame members B''' and D''' which are of the type described in the previous arrangements having the general reference numerals B and D and is locked to the frame members by means of a key K as well as shaft hexagon head 311a and nut 311b on the shaft. Key K extends into a slot in shaft 311 and a groove 316h in frame member D'''. A ring shaped oil retainer 317 of resilient oil resistant material is disposed in the space defined by the L-shaped bearing members 315, 316 and the inner adjacent surfaces of cylindrical member 310b so as to help in confining the lubricating fluid which is introduced through a conventional lubricating fluid check valve 318 in the composite bearing. The sleeve 312, L-shaped bearing members 315, 316 are clamped to the shaft 311 due to the clamping action produced by shaft hexagon head 311a and nut 311b so that those members move only upon movement of the frame members B''', D'''. The inside bearing surfaces of cylindrical member 310b are flame hardened or may be hardened by an electrical induction heating and cooling process.

The spring seats disclosed in the drawings are of a channel or U-shaped cross section and a replaceable hardened bar abuts the inner horizontal surface of the U-shaped member; it is understood however that the inner horizontal surface of the U-shaped member may be surface hardened by flame hardening or induction heating and a suitable spring seat bearing surface may be thus obtained.

I claim:

1. A vehicle suspension embodying a pair of arms pivoted about fixed parallel axes and adapted to hold a wheel axle on their free ends, an arm extending from each of the first mentioned arms and pivoted about the same axes, a resilient member having oppositely movable ends, a movable seat for each of the resilient member ends and having an external bearing surface, and a pin mounted on each of the free ends of the second mentioned arms and coacting with each of said external bearing surfaces.

2. A vehicle suspension embodying a pair of arms pivoted about fixed parallel axes and adapted to hold a wheel axle on their free ends, an arm extending from each of the first mentioned arms and pivoted about the same axes, a resilient member having oppositely movable ends, a movable seat for each of the resilient movable ends and each having an external bearing surface, a casing for said resilient member, means for fastening the casing to the vehicle body, a bearing surface on each of the second mentioned arms cooperating with each of the seat bearing surfaces, a pair of extensions on said casing, and a projection on each of said second mentioned arms cooperating with the extensions for limiting the movement of said second mentioned arm with respect to said casing.

3. In a wheel suspension for a vehicle, a casing, two pairs of hubs formed in said casing, a mutually parallel shaft passing through each pair of hubs, means for maintaining the shaft stationary with respect to the hubs, an arm pivoted about each shaft and having its free end adapted to hold a wheel axle, an arm extending from each of the first mentioned arms and pivoted about the same axes, a resilient member having oppositely movable ends, a movable seat for each of the resilient movable ends and each having an external bearing surface adapted to be engaged by the second mentioned arms, a pair of extensions on said casing, and a projection on each of the second mentioned arms coacting with said extension for limiting the movement of the arms with respect to the casing.

4. A vehicle suspension embodying a pair of arms pivoted about parallel axes and each adapted to hold a wheel axle on its free end, an arm rigidly connected to each of the first mentioned arms and pivoted about the same axes, a spring having two relatively movable ends, a movable seat for each of said spring ends and having an external bearing surface, and a cylindrical member stationarily mounted on the free end of each of said second mentioned arms and coacting with said external bearing surfaces substantially along a line contact.

5. A vehicle suspension embodying a pair of arms pivoted about parallel axes and each adapted to hold a wheel axle on its free end, a second arm rigidly connected to said first mentioned arm and pivoted about the same axes, a spring having two movable ends, a movable seat for each of the spring ends and having an external bearing surface, a clamp formed at the free ends of the second mentioned arms, and a cylindrical member stationarily mounted in the clamp and coacting with the external bearing surfaces substantially along a line contact.

6. A vehicle suspension embodying two pairs of arms pivotable about parallel axes and each pair adapted to hold a wheel axle on their free ends, an extension on each of said arms, a spring having two movable ends, a movable seat for one end of the spring and having an external bearing surface, a cylindrical member abutting said external bearing surface on a line contact, means for rigidly fastening the ends of the cylindrical member to the free ends of the extensions of one pair of arms, a spring seat for the other spring end and having a hollow portion therein, a shaft passing through the hollow portion, and means for rigidly connecting the ends of the shaft to the ends of the extensions on the remaining pair of arms.

7. In a vehicle suspension two spaced parallel shafts, a pair of arms pivoted about each one of the spaced parallel shafts and adapted to hold a wheel axle on their free ends, a tubular member joining the arms which comprise a pair, said tubular member being concentrically mounted on the corresponding shaft, resilient material disposed between and spacing each tubular member and its shaft, an extension on at least one of each pair of said arms, a resilient member having two movable ends, a movable seat for one end of the resilient member, a movable seat for the other end of the resilient member, and means comprising a bearing for joining the free end of each extension to the movable seats.

8. In a vehicle suspension, two spaced parallel shafts, a pair of arms pivoted about each one of the spaced parallel shafts and adapted to hold a wheel axle on their free ends, a tubular member joining the arms which comprise a pair, said tubular member being concentrically mounted on the corresponding shaft, resilient material disposed between and spacing each tubular member and its shaft, said resilient material extending substantially the entire length of the tubular member, an arm on at least one of each pair of the first mentioned arms, a resilient member having two movable ends and disposed with said ends adjacent the free ends of the second mentioned arms, and means for coupling adjacent free ends of the arm and adjacent ends of the resilient member.

9. A vehicle suspension embodying an arm pivoted about an axis and adapted to hold a wheel axle on its free end, a second arm rigidly connected to said arm and pivoted about the same axis, a spring having two ends at least one of which is movable, a movable seat for the movable spring end, said movable seat having a portion with a U-shaped cross section, a replaceable hardened bar abutting the inner surface of the horizontal portion of the U-shaped spring seat, and a hardened pin mounted on the free end of said second arm and contacting the hardened bar along a line contact.

10. A vehicle suspension embodying an arm pivoted about an axis and adapted to hold a wheel axle on its free end, a second arm rigidly connected to said arm and pivoted about the same axis, a spring having two ends at least one of which is movable, a movable seat for the movable spring end, said movable seat having a portion with a U shaped cross section, said movable seat having the inner surface of the horizontal portion of the U hardened, and a hardened pin mounted on the free end of said second arm and contacting the inner surface of the horizontal portion of the U along a line contact.

11. The same as in claim 9 and means for adjustably mounting said hardened pin on the free end of said second arm.

12. The same as in claim 2 and a wheel axle support on the casing.

13. The same as in claim 3 and a wheel axle support on the casing.

HARRY A. KNOX.